US007295146B2

(12) United States Patent
McMakin et al.

(10) Patent No.: US 7,295,146 B2
(45) Date of Patent: *Nov. 13, 2007

(54) HOLOGRAPHIC ARRAYS FOR MULTI-PATH IMAGING ARTIFACT REDUCTION

(75) Inventors: Douglas L. McMakin, Richland, WA (US); David M. Sheen, Richland, WA (US); Thomas E. Hall, Kennewick, WA (US)

(73) Assignee: Battelle Memorial Institute, Richland, WA (US)

( * ) Notice: Subject to any disclaimer, the term of this patent is extended or adjusted under 35 U.S.C. 154(b) by 128 days.

This patent is subject to a terminal disclaimer.

(21) Appl. No.: 11/088,470

(22) Filed: Mar. 24, 2005

(65) Prior Publication Data

US 2007/0205936 A1    Sep. 6, 2007

(51) Int. Cl.
  *G01S 13/89* (2006.01)
(52) U.S. Cl. .................. 342/22; 342/179; 342/188
(58) Field of Classification Search .............. 342/22, 342/179
  See application file for complete search history.

(56) References Cited

U.S. PATENT DOCUMENTS

| 3,755,810 | A | * | 8/1973 | Latham et al. .............. 342/181 |
| 4,829,303 | A | * | 5/1989 | Zebker et al. .............. 342/25 A |
| 4,910,523 | A | * | 3/1990 | Huguenin et al. ........... 342/179 |
| 5,047,783 | A | * | 9/1991 | Hugenin ..................... 342/179 |
| 5,073,782 | A | * | 12/1991 | Huguenin et al. ........... 342/179 |
| 5,227,797 | A | * | 7/1993 | Murphy ....................... 342/22 |
| 5,227,800 | A | * | 7/1993 | Huguenin et al. ........... 342/179 |
| 5,859,609 | A | * | 1/1999 | Sheen et al. ................. 342/179 |
| 6,507,309 | B2 | * | 1/2003 | McMakin et al. ............ 342/22 |
| 6,657,577 | B1 | * | 12/2003 | Gregersen et al. ........... 342/22 |
| 6,703,964 | B2 | * | 3/2004 | McMakin et al. ............ 342/22 |
| 2004/0090359 | A1 | * | 5/2004 | McMakin et al. ............ 342/22 |
| 2004/0140924 | A1 | * | 7/2004 | Keller et al. ................. 342/22 |
| 2004/0263379 | A1 | | 12/2004 | Keller |
| 2005/0099330 | A1 | * | 5/2005 | Hausner et al. .............. 342/22 |

OTHER PUBLICATIONS

Appleby, R., et al, Whole body 35GHz security scanner, Proceedings of SPIE, 2004, p. 244-251, vol. 5410, USA.

(Continued)

*Primary Examiner*—Thomas H. Tarcza
*Assistant Examiner*—Matthew M Barker
(74) *Attorney, Agent, or Firm*—Douglas E. McKinley, Jr.

(57) ABSTRACT

A method and apparatus to remove human features utilizing at least one transmitter transmitting a signal between 200 MHz and 1 THz, the signal having at least one characteristic of elliptical polarization, and at least one receiver receiving the reflection of the signal from the transmitter. A plurality of such receivers and transmitters are arranged together in an array which is in turn mounted to a scanner, allowing the array to be passed adjacent to the surface of the item being imaged while the transmitter is transmitting electromagnetic radiation. The array is passed adjacent to the surface of the item, such as a human being, that is being imaged. The portions of the received signals wherein the polarity of the characteristic has been reversed and those portions of the received signal wherein the polarity of the characteristic has not been reversed are identified. An image of the item from those portions of the received signal wherein the polarity of the characteristic was reversed is then created.

13 Claims, 8 Drawing Sheets

OTHER PUBLICATIONS

McMakin, Douglas L., et al, Millimeter-wave imaging for concealed weapon detection, Proceedings of SPIE, 2003, p. 52-62, vol. 5048, USA.

McMillan, R.W., et al, IR polarimetry and far IR imaging, Proceedings of SPIE, 2004, p. 111-117, vol. 5563, USA.

Sheen, David M., et al, Circularly polarized millimeter-wave imaging for personnel screening, Proceedings of SPIE, 2005, p. 117-126, vol. 5789, USA.

Sheen, David M., et al, Three-Dim. Millimeter-Wave Imaging for Concealed Weapon Detection, IEEE Trans. on Microwave Theory & Tech., Sep. 2001, p. 1581-1592, vol. 49, No. 9, USA.

* cited by examiner

HOLOGRAPHIC ARRAYS FOR MULTI-PATH IMAGING ARTIFACT REDUCTION

STATEMENT REGARDING FEDERALLY SPONSORED RESEARCH OR DEVELOPMENT

This invention was made with Government support under Contract DE-AC05-76RL01830 awarded by the U.S. Department of Energy. The Government has certain rights in the invention.

CROSS-REFERENCE TO RELATED APPLICATIONS

Not Applicable

BACKGROUND OF THE INVENTION

Active and passive millimeter-wave imaging systems have been demonstrated to have the capability to penetrate clothing and produce images of the person underneath the clothing, together with a wide variety of concealed threats including explosives, handguns, and knives. Examples of such systems are found in the following references. The entire text of these references, and all other papers, publications, patents, or other written materials disclosed herein are hereby incorporated into this specification in their entirety by this reference.

1. Sheen, D. M., D. L. McMakin, and T. E. Hall, *Three-dimensional millimeter-wave imaging for concealed weapon detection.* IEEE Transactions on Microwave Theory and Techniques, 2001. 49(9): p. 1581-92.
2. Sheen, D. M., et al., *Concealed explosive detection on personnel using a wideband holographic millimeter-wave imaging system.* Proceedings of the SPIE—AEROSENSE Aerospace/Defense Sensing and Controls, 1996. 2755: p. 503-13.
3. McMakin, D. L., et al. *Detection of Concealed Weapons and Explosives on Personnel Using a Wide-band Holographic Millimeter-wave Imaging System.* in *American Defense Preparedness Association Security Technology Division Joint Security Technology Symposium.* 1996. Williamsburg, Va.
4. McMakin, D. L., et al., *Wideband, millimeter-wave, holographic weapons surveillance system.* Proceedings of the SPIE—EUROPTO European symposium on optics for environmental and public safety, 1995. 2511: p. 131-141.
5. Sinclair, G. N., et al., *Passive millimeter-wave imaging in security scanning.* Proc. SPIE, 2000. 4032: p. 40-45.
6. Sheen, D. M., D. L. McMakin, and T. E. Hall, *Combined illumination cylindrical millimeter-wave imaging technique for concealed weapon detection.* Proceedings of the SPIE—Aerosense 2000: Passive Millimeter-wave Imaging Technology IV, 2000.4032.
7. Sheen, D. M., D. L. McMakin, and T. E. Hall, *Cylindrical millimeter-wave imaging technique for concealed weapon detection.* Proceedings of the SPIE—26th AIPR Workshop:Exploiting new image sources and sensors, 1997. 3240: p. 242-250.
8. McMakin, D. L. and D. M. Sheen. *Millimeter-wave high-resolution holographic surveillance systems.* in *AAAE Airport Security Technology Conference.* 1994. Atlantic City, N.J.: AAAE.
9. McMakin, D. L., et al., *Cylindrical holographic imaging system privacy algorithm final report.* 1999, Pacific Northwest National Laboratory: Richland, Wash.
10. Keller, P. E., et al., *Privacy algorithm for cylindrical holographic weapons surveillance system.* IEEE Aerospace and Electronic Systems Magazine, 2000. 15(2): p. 17-24.
11. Michelson, D. G. and I. G. Cumming, *A calibration algorithm for circular polarimetric radars.* Journal of Electromagnetic Waves and Applications, 1997. 11: p. 659-674.
12. Yueh, S. and J. A. Kong, *Calibration of polarimetric radars using in-scene reflectors.* Journal of Electromagnetic Waves and Applications, 1990. 4(1): p. 27-48.
13. Fujita, M., et al., *Polarimetric calibration of the SIR-C C-Band channel using active radar calibrators and polarization selective dihedrals.* IEEE Transactions on Geoscience and Remote Sensing, 1998. 36(6): p. 1872-1878.
14. U.S. Pat. No. 5,859,609 "Real-Time Wideband Cylindrical Holographic System" issued Jan. 12, 1999 to Sheen et al.
15. U.S. Pat. No. 6,507,309 "Interrogation of an Object for Dimensional and Topographical Information" issued Jan. 14, 2003 to McMakin et al.
16. U.S. Pat. No. 6,703,964 "Interrogation of an Object for Dimensional and Topographical Information" issued Mar. 9, 2004 to McMakin et al.
17. U.S. patent application Ser. No. 10/607,552, "Concealed Object Detection," filed Jun. 26, 2003
18. U.S. patent application Ser. No. 10/697,848, "Detecting Concealed Objects at a Checkpoint," filed Oct. 30, 2003.

Active millimeter-wave imaging systems operate by illuminating the target with a diverging millimeter-wave beam and recording the amplitude and phase of the scattered signal over a wide frequency bandwidth. Highly efficient Fast Fourier Transform (FFT) based image reconstruction algorithms can then mathematically focus, or reconstruct, a three-dimensional image of the target as described in Sheen, D. M., D. L. McMakin, and T. E. Hall, *Three-dimensional millimeter-wave imaging for concealed weapon detection.* IEEE Transactions on Microwave Theory and Techniques, 2001. 49(9): p. 1581-92. Millimeter-waves can readily penetrate common clothing materials and are reflected from the human body and any concealed items, thus allowing an imaging system to reveal concealed items. Passive millimeter-wave imaging systems operate using the natural millimeter-wave emission from the body and any concealed items. These systems use lenses or reflectors to focus the image, and rely on temperature and/or emissivity contrast to form images of the body along with any concealed items. In indoor environments passive systems often have low thermal contrast, however, active illumination has been demonstrated to improve the performance of these systems. Active millimeter-wave imaging systems have several advantages over passive systems including elimination of bulky lenses/reflectors, high signal-to-noise ratio operation, and high contrast for detection of concealed items. In addition to millimeter-wave imaging systems, backscatter x-ray systems have also been developed for personnel screening. These systems can be very effective, however, they are bulky and may not be well-received by the public due to their use of ionizing radiation (even though they operate at low x-ray levels).

Active, wideband, millimeter-wave imaging systems have been developed for personnel screening applications. These systems utilize electronically controlled, sequentially switched, linear arrays of wideband antennas to scan one axis of a two-dimensional aperture. A high-speed linear mechanical scanner is then used to scan the other aperture axis. The microwave or millimeter-wave transceiver is coupled to the antenna array using a network of microwave/millimeter-wave switches. Amplitude and phase reflection data from the transceiver are gathered over a wide frequency bandwidth and sampled over the planar aperture. These data are then focused or reconstructed using a wideband, three-dimensional, image reconstruction algorithms. The resolution of the resulting images is diffraction-limited, i.e. it is limited only by the wavelength of the system, aperture size, and range to the target and is not reduced by the reconstruction process. Preferred algorithms make extensive use of one, two, and three-dimensional FFT's and are highly efficient. Imaging systems utilizing a planar, rectlinear aperture are restricted to a single view of the target. To overcome this limitation, a cylindrical imaging system has been developed. This system utilizes a vertical linear array that has its antennas directed inward and is electronically sequenced in the vertical direction and mechanically scanned around the person being screened. Data from this system can be reconstructed over many views of the target creating an animation of the imaging results in which the person's image rotates.

All imaging systems proposed for personnel screening typically produce image artifacts, created by the detection of signals that have been reflected more than one time (multi-path) by the item being imaged. These artifacts are undesirable because they distract from the underlying item being imaged, such as concealed objects. Accordingly, there is a need for new imaging techniques that highlight concealed objects, and/or suppress multipath artifacts in the images.

BRIEF SUMMARY OF THE INVENTION

Accordingly, it is an object of the present invention to provide a method to remove multi-path imaging artifacts in an imaging system having at least one transmitter transmitting electromagnetic radiation between 200 MHz and 1 THz, and at least one receiver receiving the reflective signal from said transmitter. These and other objects of the present invention are accomplished by the steps of transmitting a signal having at least one characteristic of elliptical polarization from at least one transmitter that transmits electromagnetic radiation between 200 MHz and 1 THz. Preferably, but not meant to be limiting, as shown in FIG. 8, the plurality of receivers 1 and transmitters 2 are arranged together in an array 3, and the array 3 is passed adjacent to the surface of the item being imaged while the transmitter 2 is transmitting electromagnetic radiation. The array 3 is passed adjacent to the surface of the item, such as a human being, that is being imaged, preferably, but not meant to be limiting, either by configuring the scanner to circle the array around the surface of the item, or to move the array 3 in a rectilinear plane parallel to the surface of the item. The reflection of the transmitted signal is then received with one or more receivers 1. The present invention then provides a computer 4 in communication with the receivers. The present invention is configured to identify those portions of the received signals wherein the polarity of the characteristic has been reversed, and those portions of the received signal wherein the polarity of the characteristic has not been reversed. As used herein the "characteristic" of the polarity refers to the handedness of the elliptical polarization determined directly from the transceiver or synthesized mathematically from fully-polarimetric data. Preferably, but not meant to be limiting, the present invention utilizes a fully polarimetric configuration. As used herein fully-polarimetric means a set of measurements that allow the polarization altering properties of any reflecting target to be determined. A fully-polarimetric linearly polarized system is typically comprised of linearly polarized measurements consisting of all four combinations transmit and receive polarizations including HH, HV, VH, and VV where H is used to indicate horizontal polarization, V is used to indicate vertical polarization, the first letter indicates the transmit antenna polarization, and the second letter indicates the receive antenna polarization. A fully polarimetric circularly polarized system is typically comprised of circularly polarized measurements consisting of all four combinations transmit and receive polarizations including LL, LR, RL, and RR where L is used to indicate left-hand circular polarization (LHCP), R is used to indicate right-hand circular polarization (RHCP), the first letter indicates the transmit antenna polarization, and the second letter indicates the receive antenna polarization. It should be noted that the fully-polarimetric data in one basis (e.g. linear) can be mathematically transformed to another basis (e.g. circular). In addition to linear and circular polarization other independent combinations of elliptical polarization could, in principle, be used to form a fully polarimetric set. It should also be noted that for some targets it may only be necessary to gather three of the four measurements as the diagonal terms (e.g. HV and VH or LR and RL) may be expected to be identical. As those having ordinary skill in the art will recognize, in many cases it will not be necessary to utilize a fully-polarimetric configuration to determine whether a characteristic of polarity has been reversed. Accordingly, fully-polarimetric should be understood to encompass any and all configurations that allow the identification of a change of a characteristic of polarity of a given signal. The computer is further configured to create an image of the item from those portions of the received signal wherein the polarity of the characteristic was reversed.

Preferably, but not meant to be limiting, the elliptical polarization is selected as circular polarization. Preferably, but not meant to be limiting, the characteristic of elliptical polarization is selected from the group of right handedness and left handedness. Thus, by way of example, the present invention can utilize transmitters that transmit vertically and horizontally polarized signals and receive both vertically and horizontally polarized signals. Alternately, the present invention can utilize transmitters that transmit left and right handed circularly polarized signals, and receive left and right handed circularly polarized signals. In this manner, for any given transmitted signal, the present invention can detect and identify the state of polarization, and whether the number of reflections that have occurred between transmission and receipt was odd or even. Accordingly, the image constructed from the reflected signal can be limited to only those portions of the reflected signal that have been reflected an odd number of times.

DETAILED DESCRIPTION OF THE INVENTION

An experiment was conducted to demonstrate the ability of the present invention to remove artifacts created from multiple reflections of an imaging system imaging a mannequin. Circular polarimetric imaging was employed to obtain additional information from the target, which was then used to remove those features.

Circularly polarized waves incident on relatively smooth reflecting targets are typically reversed in their rotational handedness, e.g. left-hand circular polarization (LHCP) is reflected to become right-hand circular polarization (RHCP). An incident wave that is reflected twice (or any even number) of times prior to returning to the transceiver, has its handedness preserved. Sharp features, such as wires and edges, tend to return linear polarization, which can be considered to be a sum of both LHCP and RHCP. These characteristics are exploited by the present invention by allowing differentiation of smooth features, such as the body, and sharper features such as those that might be present in many concealed items. Additionally, imaging artifacts due to multipath can be identified and eliminated. Laboratory imaging results have been obtained in the 10-20 GHz frequency range and are presented below.

Figure 1:
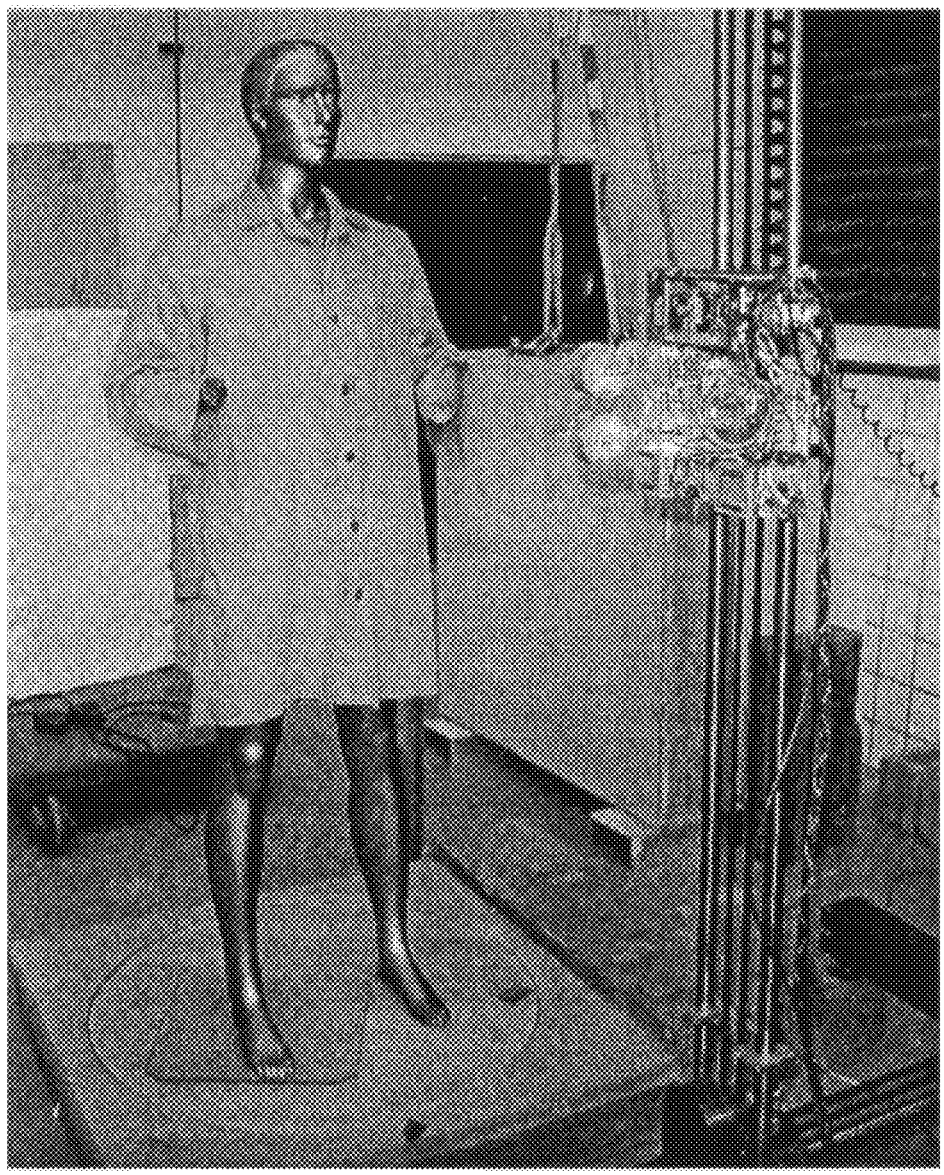
FIG. 1 is an experimental imaging configuration used in experiments to demonstrate an embodiment of the present invention showing the mannequin on a rotating platform with axis placed 1.0 meter in front of a rectilinear scanner. The transceiver is mounted on the shuttle of the rectilinear scanner.
Figure 2:
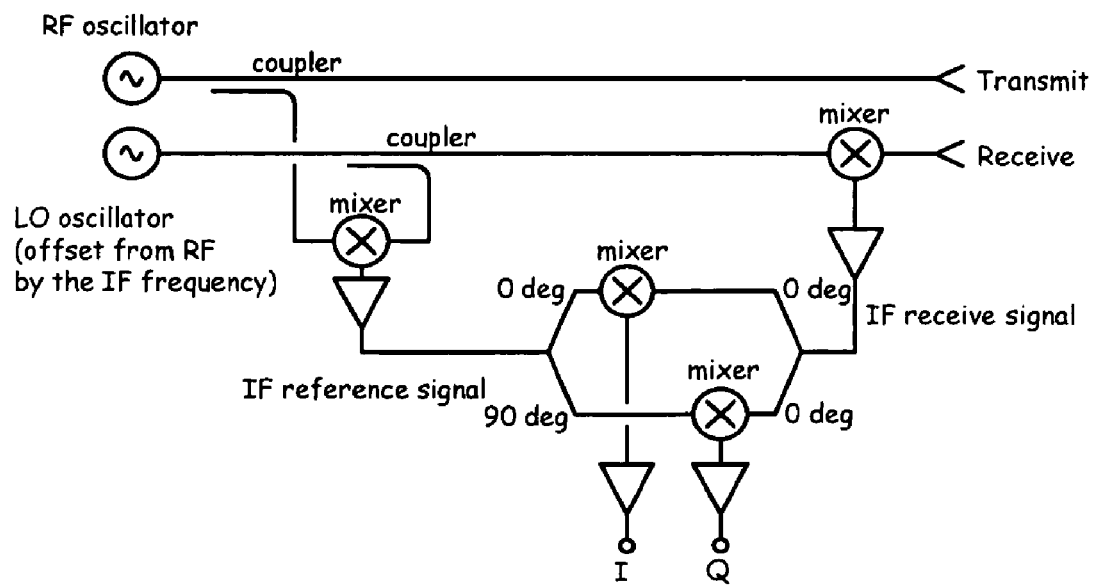
FIG. 2 is schematic diagram of the 10-20 GHz microwave transceiver used in the experimental imaging configuration used in experiments to demonstrate an embodiment of the present invention.
Figure 3:
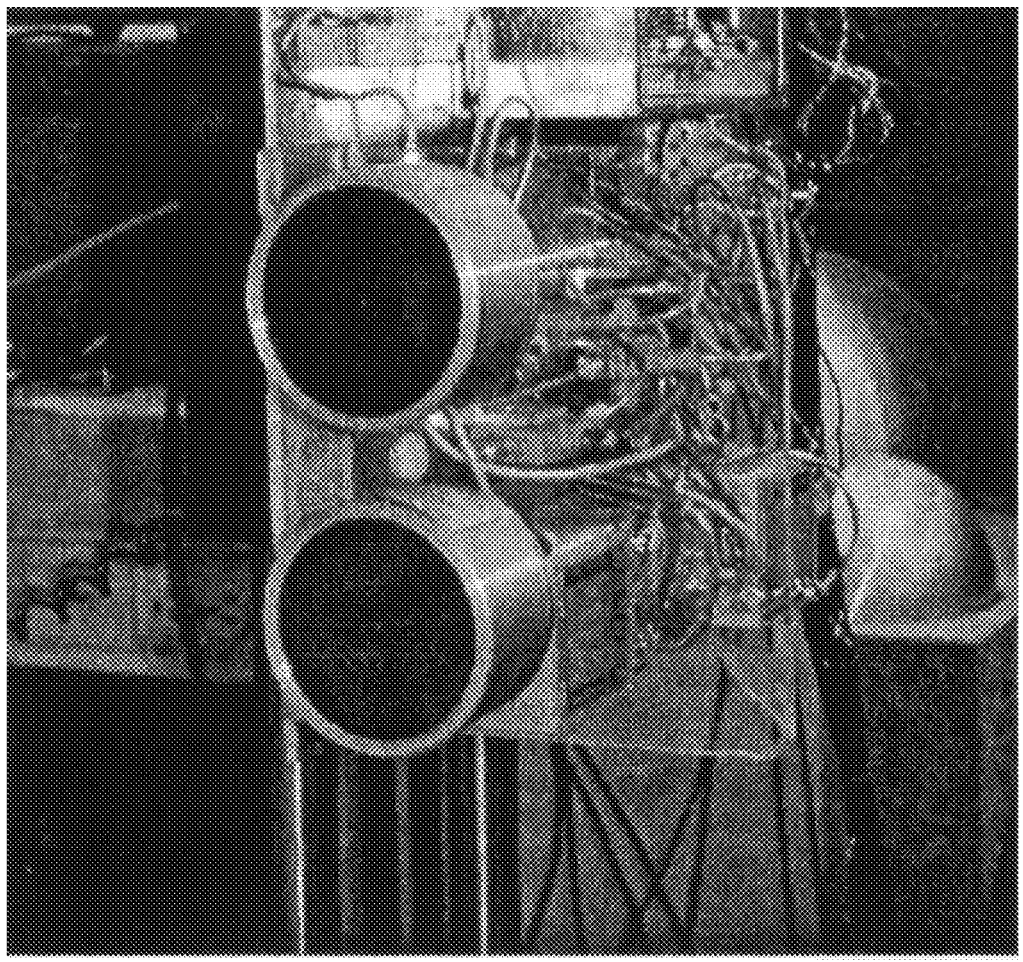
FIG. 3 is a photograph of the spiral antennas used for the laboratory imaging measurements in experiments to demonstrate an embodiment of the present invention.

A laboratory imaging system was set up to explore the characteristics of the circular polarization imaging system and obtain imaging results. The experimental imaging configuration used a rotating platform placed in front of a rectlinear (x-y) scanner as shown in FIG. 1. This system emulates a linear array based cylindrical imaging system by mechanically scanning the transceiver (shown on the shuttle of the x-y scanner in FIG. 1) at each rotational angle of rotating platform. The system was set up to operate over the 10-20 GHz frequency range and a simplified schematic of the transceiver is shown in FIG. 2. The transceiver uses two YIG oscillators offset from each other by approximately 300 MHz for the RF and LO oscillators. Directional couplers are used to sample the outputs of both oscillators and a mixer is used to derive an IF reference signal that will be coherent with the IF signal returned from the target. This IF signal is then down-converted in quadrature to obtain the in-phase (I) and quadrature (Q) signals, where $I+jQ=Ae^{j\phi}$ and A is the amplitude and $\phi$ is the phase. The circularly polarized antennas used with the transceiver were cavity backed spiral antennas with a diameter of approximately 6 cm. purchased from Antenna Research Associates, Inc., Beltsville, Md. The axial ratio of these antennas is nominally 1.5 dB and the gain is nominally 1.5 dBi in the 10-20 GHz frequency band. A photograph of the antennas is shown in FIG. 3. Three antennas were used, two right hand circularly polarized (RHCP) and one left hand circularly polarized (LHCP) antenna. This allows for co-polarized imaging tests using the two RHCP antennas. This configuration is referred to as RR. Using the RHCP antenna to transmit and the LHCP antenna to receive results in the cross-polarized imaging configuration, which is referred to herein as RL. In addition to the circularly polarized antennas, conventional pyramidal waveguide horns were used with the transceiver and imaging system. This allowed for comparison of the circular polarization imaging results with more conventional linear polarized results.

The transceiver was coupled to a data acquisition (analog-to-digital converter) system that was mounted within a Windows XP, Intel Xeon based computer workstation. This computer system was then used to control the scanner system, acquire data, and perform the image reconstructions.

One of the primary considerations for using circular polarization is the ability to suppress multiple (or even) bounce reflections from single (or odd) bounce reflections from the target. This may allow suppression of multipath image artifacts from the body such as between the legs and underneath the arms.

A metallized mannequin was used for imaging tests in these experiments. This mannequin is shown clothed in a laboratory coat and unclothed in FIG. 4. The axis of the rotary platform was placed at a range of 1.0 meters from the antenna phase center to form a cylindrical scanner with 1.0 meter radius. The vertical scan consisted of a 1.36 meter length with 256 samples. The angular scan consisted of 1.25 revolutions and 1280 samples. The frequency range was 10-20 GHz using 256 frequency samples.

Figure 4:
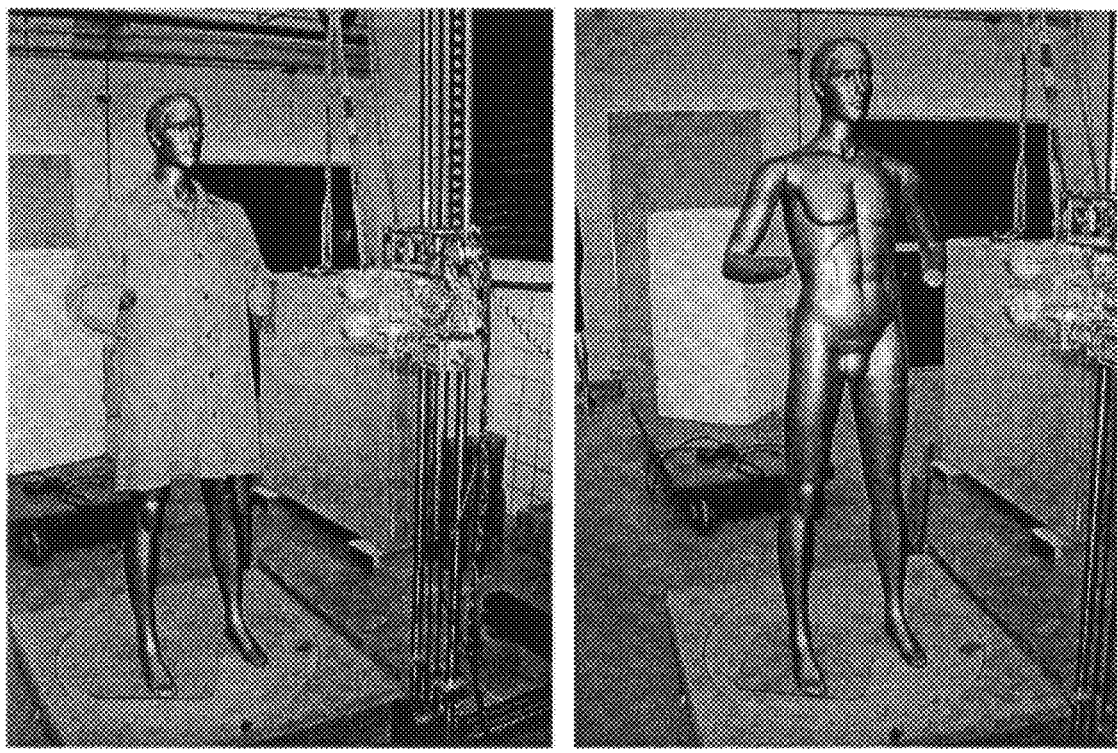
FIG. 4 are photographs of clothed and unclothed mannequin with no concealed weapons used in experiments to demonstrate an embodiment of the present invention.
Figure 5:
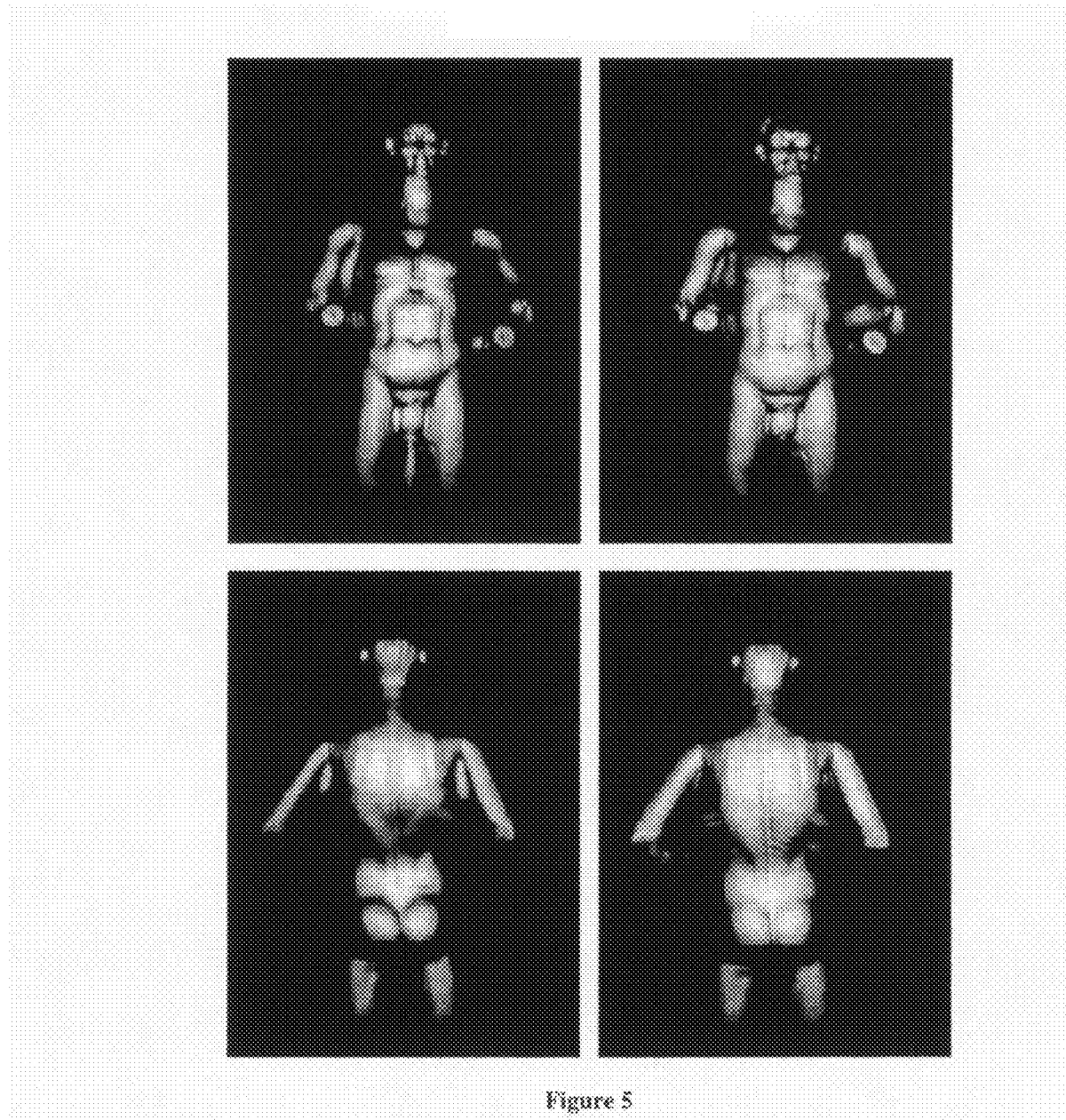
FIG. 5 are 10-20 GHz imaging results from the mannequin with no concealed weapons (from the left, HH and RL polarizations).
Figure 6:
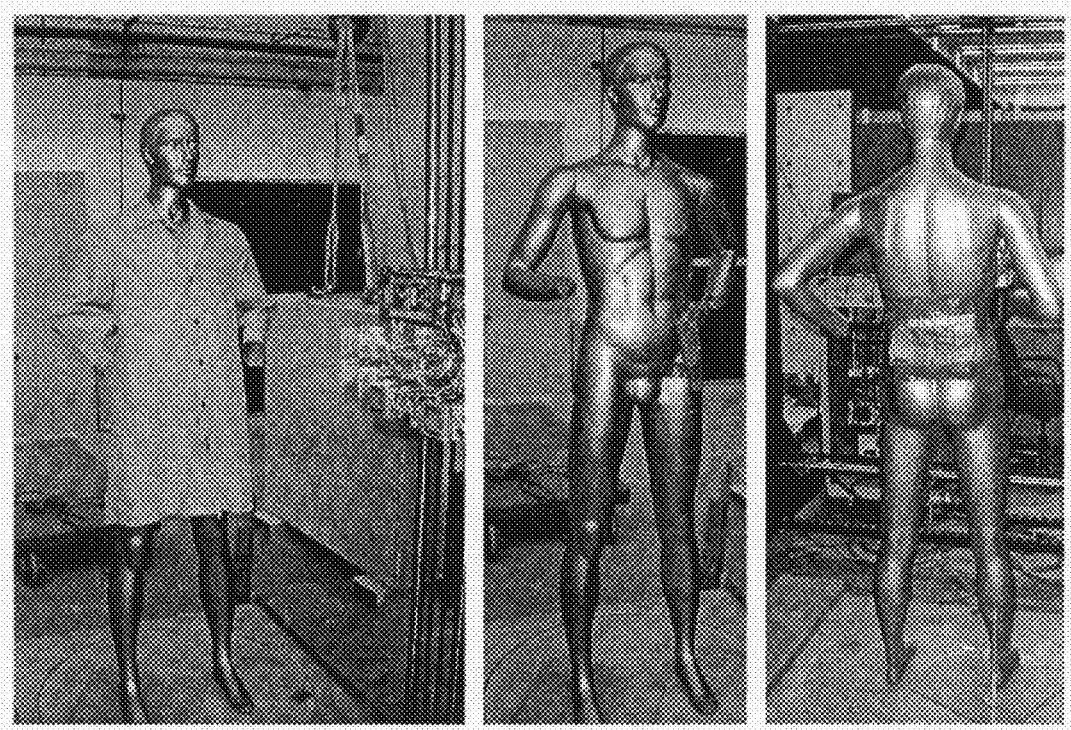
FIG. 6 shows photographs of clothed and unclothed mannequin with a concealed metal handgun (on the abdomen) and simulated plastic explosive (on the lower back) used in the experimental imaging configuration in experiments conducted to demonstrate an embodiment of the present invention.
Figure 7:
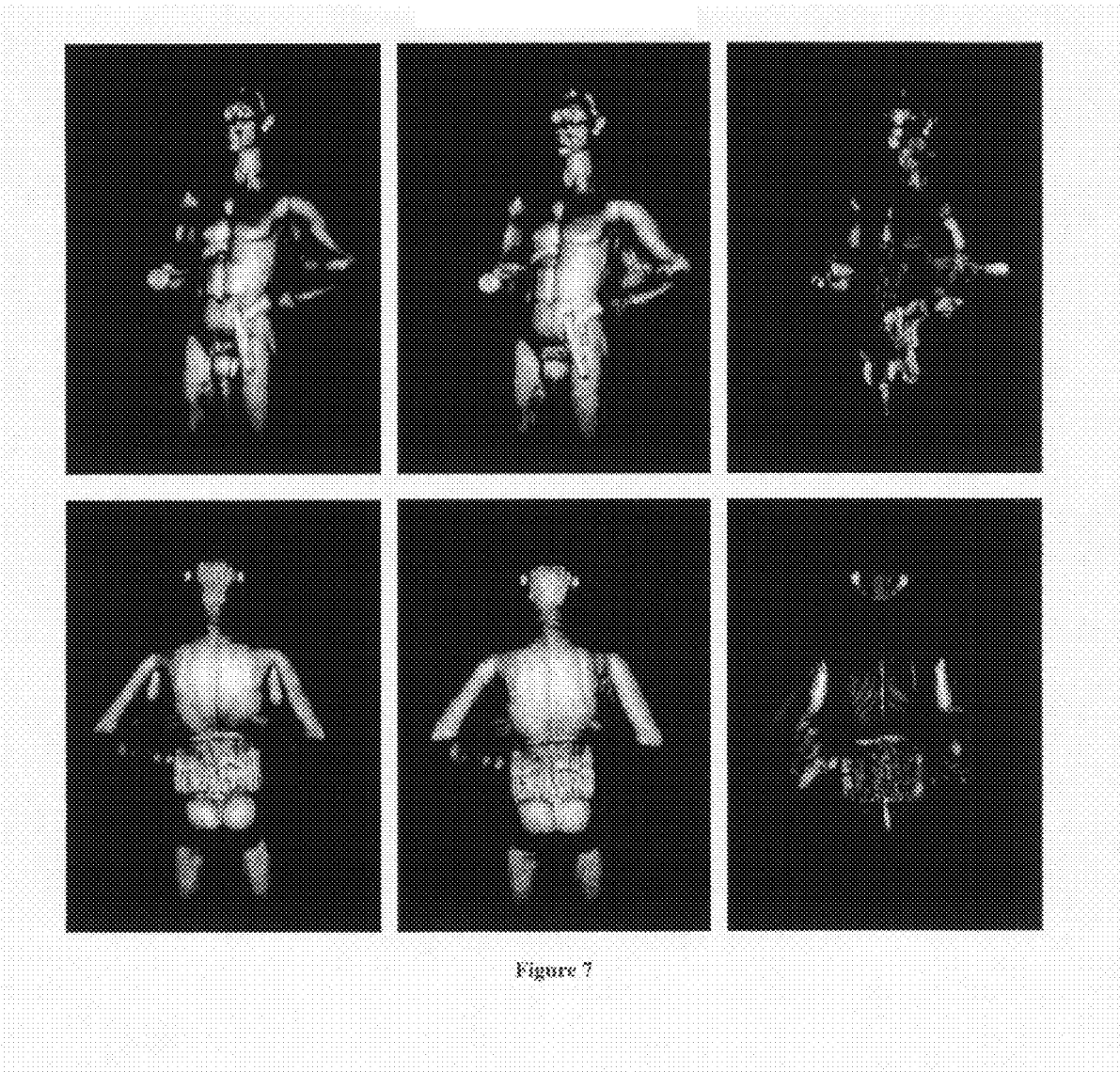
FIG. 7 shows 10-20 GHz imaging results from the mannequin of FIG. 6 with a concealed metal handgun (on the abdomen) and simulated plastic explosive (on the lower back). Left side images are HH polarization, the center images are RL polarization, and right side images are RR polarization.
Figure 8:
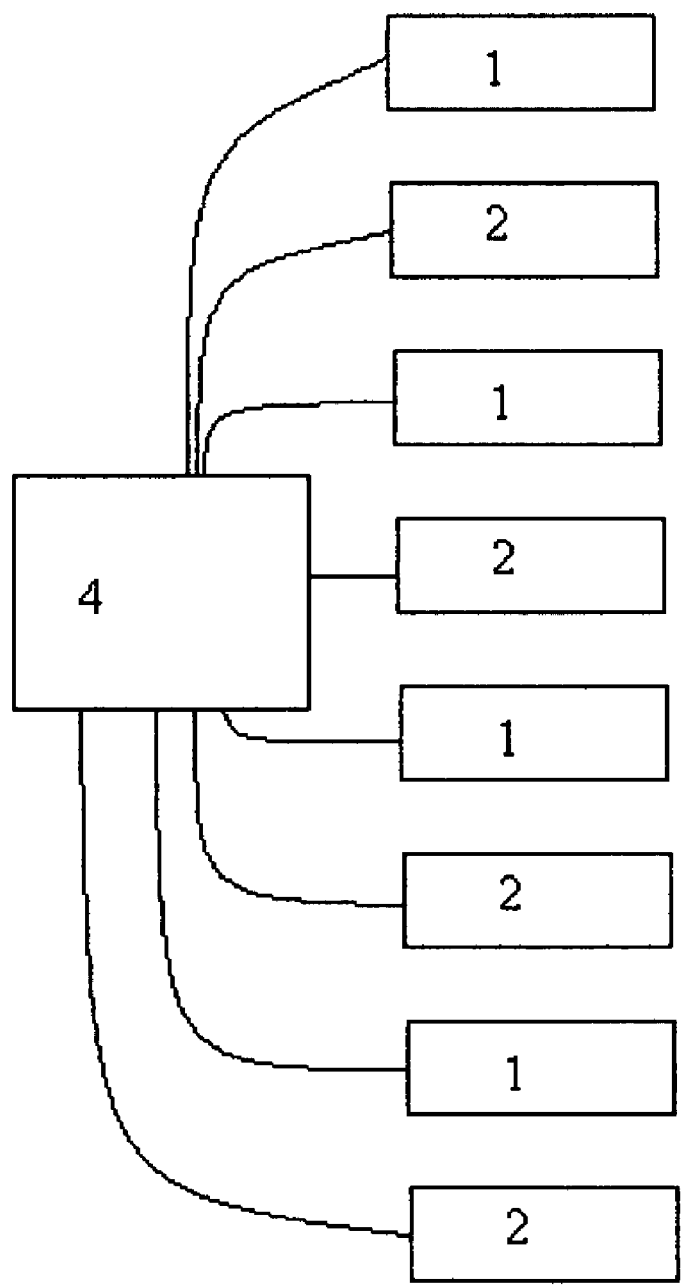
FIG. 8 is a schematic drawing of one embodiment of the present invention showing a plurality of receivers and transmitters arranged in an array and connected to a computer.

Imaging results from a clothed mannequin with no concealed weapons (as shown in FIG. 4) are shown in FIG. 5. Images were obtained using 90 degree arc segments of cylindrical data centered at 64 uniformly spaced angles ranging from 0 to 360 degrees with sample images shown at 0 and 180 degrees in the figure. Two polarization combinations were imaged using otherwise identical experimental parameters. The HH images are shown on the left side of FIG. 5 and RL images on the right. As shown in the images, multipath signal returns are removed. In the HH images multipath artifacts can be observed between the thighs and between the mannequins right arm and body. These artifacts are not present in the RL image which suppresses double (or even) bounce reflections. Similar results are observed in the back view images in FIG. 7. The primary multipath artifacts in the HH image is between the upper arm and the body of the mannequin. These artifacts are eliminated in the RL image and isolated in the RR image.

CLOSURE

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A method to remove multi-path imaging artifacts from images of items in an imaging system having at least one transmitter transmitting electromagnetic radiation between 200 MHz and 1 THz and at least one receiver receiving the reflective signal from said transmitter comprising the steps of:
   a. transmitting a signal having at least one characteristic of elliptical polarization at an item,
   b. receiving a reflection of said signal,
   c. identifying those portions of said received signal wherein the polarity of said characteristic is reversed and those portions of said received signal wherein the polarity of said characteristic is not reversed,
   d. creating an image from those portions of said received signal wherein the polarity of said characteristic is reversed.

2. The method of claim 1 wherein said elliptical polarization is circular polarization.

3. The method of claim 1 wherein said characteristic is selected from the group of right handedness and left handedness.

4. The method of claim 1 wherein said signal is fully-polarimetric.

5. The method of claim 1 wherein a plurality of receivers and transmitters are arranged in an array and are passed adjacent to the surface of an item being imaged.

6. The method of claim 5 wherein said the step of passing the array adjacent to the surface of the item being imaged is selected from the group of circling the array around the surface of said item, and moving the array in a rectilinear plane parallel to the surface of said item.

7. An imaging system comprising:
   a. at least one transmitter configured to transmit electromagnetic radiation at an item between 200 MHz and 1 THz and having at least one characteristic of elliptical polarization,
   b. at least one receiver capable of receiving at least one characteristic of elliptical polarization from a reflected signal from said transmitter,
   c. a computer configured to identify those portions of said received signal wherein the polarity of said characteristic is reversed and those portions of said received signal wherein the polarity of said characteristic is not reversed, and create an image from those portions of said received signal wherein the polarity of said characteristic is reversed.

8. The imaging system of claim 7 wherein said elliptical polarization is circular polarization.

9. The imaging system of claim 7 wherein said characteristic is selected from the group of right handedness and left handedness.

10. The imaging system of claim 7 wherein said signal is fully-polarimetric.

11. The imaging system of claim 7 wherein a plurality of receivers and transmitters are arranged in an array and are mounted on a scanner capable of passing the array adjacent to the surface of an item being imaged.

12. The imaging system of claim 11 wherein the scanner is capable of rotating the array around the surface of said item.

13. The imaging system of claim 11 wherein the scanner is capable of passing the array in a rectilinear plane parallel to the surface of said item.

* * * * *